US005323612A

United States Patent [19]

Werner

[11] Patent Number: 5,323,612
[45] Date of Patent: Jun. 28, 1994

[54] EXHAUST GAS TURBOCHARGER ARRANGEMENT

[75] Inventor: Johannes Werner, Waiblingen, Fed. Rep. of Germany

[73] Assignee: Mercedes-Benz AG, Fed. Rep. of Germany

[21] Appl. No.: 960,099

[22] Filed: Oct. 13, 1992

[30] Foreign Application Priority Data

Oct. 11, 1991 [DE] Fed. Rep. of Germany ....... 4133736

[51] Int. Cl.[5] .................................................. F02B 33/44
[52] U.S. Cl. ..................................... 60/605.1; 60/611;
415/123; 415/69
[58] Field of Search ................ 60/605.1, 611; 415/123,
415/61, 62, 64, 69; 417/407

[56] References Cited

U.S. PATENT DOCUMENTS

| 4,155,684 | 5/1979 | Curiel et al. | 417/409 |
| 4,586,878 | 5/1986 | Witchger | 417/407 |
| 4,726,744 | 2/1988 | Arnold | 417/407 |
| 4,843,813 | 7/1989 | Paul | 60/39.162 |

FOREIGN PATENT DOCUMENTS

| 1576231 | 6/1970 | Fed. Rep. of Germany | 60/605.1 |
| 219827 | 3/1985 | Fed. Rep. of Germany | |
| 4011818 | 10/1991 | Fed. Rep. of Germany | |
| 1140909 | 1/1969 | United Kingdom | 60/600 |
| 2046848 | 11/1980 | United Kingdom | |

OTHER PUBLICATIONS

Variable-Geometry Turbo Increases Power, Minimizes Response Lag, Automotive Engineering, Sep. 1985, pp. 70–72.
British Novelty Search Report, dated Nov. 20, 1992.

Primary Examiner—Richard A. Bertsch
Assistant Examiner—Charles G. Freay
Attorney, Agent, or Firm—Evenson, McKeown, Edwards & Lenahan

[57] ABSTRACT

An exhaust gas turbocharger for an internal combustion engine is described, in the turbine housing of which there is arranged upstream of the turbine wheel a turbine guide wheel which is mounted rotatably relative to the turbine wheel. In order to be able to improve the response of the internal combustion engine after a positive load change without any impairment of the overall efficiency of the internal combustion engine, it is proposed to provide at least one braking device which reduces the speed of the turbine guide apparatus in higher load.

17 Claims, 5 Drawing Sheets

EXHAUST GAS TURBOCHARGER ARRANGEMENT

BACKGROUND AND SUMMARY OF THE INVENTION

The invention relates to an exhaust gas turbocharger for an internal combustion engine of the type having a turbine wheel in a turbine housing, which turbine wheel is driven by engine exhaust gas and is connected via a shaft to a compressor wheel in a compressor housing, and a turbine guide wheel arranged upstream of the turbine wheel and mounted rotatably relative thereto and having a speed which can be varied as a function of engine load.

In an exhaust gas turbocharger disclosed in the prior German Published Patent Application DE 4 011 818 it is provided to fix the guide wheel concentrically surrounding the turbine wheel in the low to high part load range and to feed a portion of the exhaust gas energy in the high load ranges back into the crankshafts of the internal combustion engine (compound drive) via this guide wheel, which yields a clear improvement in the efficiency of the internal combustion engine. However, in the case of a fixed turbine guide wheel a relatively steep approach flow onto the turbine wheel takes place depending on the blading of the guide wheel, resulting in a relatively low turbine wheel speed and thus a low turbine output. This has a disadvantageous effect on the response of the exhaust gas turbocharger or of the internal combustion engine after a positive load change.

It is known from "Automotive Engineering, September 1985, pages 70-72" to provide in an exhaust gas turbocharger a permanently fixed turbine guide lattice whose blades are set in the low load range, resulting in a flatter approach flow onto the turbine wheel and thus a higher turbine speed in these operating ranges. This setting of the blades is, however, bound up with a reduction in the flow cross-section, so that in these operating states there are high friction losses, which have a negative influence on the efficiency of the exhaust gas turbocharger and thus, in turn, on the overall efficiency of the internal combustion engine. The adjustment of the guide blades is performed via a mechanically operating adjustment apparatus whose components are partly arranged likewise in the turbine housing. The guide apparatus is therefore subjected to a high thermal load.

It is therefore an object of the invention to provide an exhaust gas turbocharger of the type referred to above, with which the response of the internal combustion engine after a positive load change can be improved without any impairment of the overall efficiency of the internal combustion engine.

The object is achieved according to the invention by providing an arrangement wherein at least one braking device serves to reduce the speed of the guide wheel in higher load ranges.

The invention ensures that a relatively high turbine wheel speed is reached even in the part load range, so that the exhaust gas turbocharger can be maintained at a relatively high speed. Consequently, after a positive load change the exhaust gas turbocharger very quickly reaches its speed corresponding to the new load value, so that the output corresponding to this stipulated load is also delivered by the internal combustion engine just shortly after the change in the stipulated load. Owing to the fact that the approach-flow direction in the exhaust gas turbocharger according to the invention is influenced not by a change in position of guide blades but by a change in speed of the guide wheel, the change in the approach-flow direction onto the turbine wheel is not bound up with a change in the flow cross-section. In other words, this means that the relatively high turbine speed is reached in the part load range without an appreciable reduction in the flow cross section, so that there are also no additional friction losses reducing the efficiency of the exhaust gas turbocharger or the overall efficiency of the internal combustion engine.

Moreover, in a manner completely opposite to a conventional exhaust gas turbocharger having adjustable turbine geometry, the exhaust gas turbocharger according to the invention also enables impulsive charging (two-duct turbine housing), because here the guide blades are arranged fixed on the guide wheel and thus capable in terms of strength of withstanding the increased stress of impulsive charging.

A further advantage of the exhaust gas turbocharger according to the invention is to be seen in that the device for braking the turbine guide wheel can be arranged in the region of colder zones, so that said device also is not prematurely threatened with wear because of too high thermal charging.

The heat produced during a braking operation can be dissipated directly via the cooling water of the internal combustion engine, so that after a cold start of the internal combustion engine its warm-up phase can be shortened. The quantity of heat produced during a braking operation can also be reduced if, as proposed in certain preferred embodiments of the invention, the turbine guide wheel is connected or coupled to a compressor guide wheel concentrically surrounding the wheel of the compressor, which compressor guide wheel has a blading opposite to that of the turbine guide wheel. Such an opposite blading has the effect that starting from a specific limit value for the internal combustion engine load the set of guide wheels, that is to say the unit composed of compressor guide wheel and turbine guide wheel, is ever more strongly braked with increasing load. Given an appropriate design of the turbine guide wheel blading and compressor guide wheel blading, it is even possible to eliminate a further braking device according to certain contemplated embodiments.

Moreover, a compressor guide wheel surrounding the compressor wheel acts like a second compressor stage and thus increases in an advantageous way the pressure difference in the quantity of air throughput.

The use of a hydraulic retarder as braking device has the advantage that not only can the heat produced by the braking of the turbine guide wheel be dissipated via the hydraulic fluid led off from the hydraulic retarder during the control process—the hydraulic fluid can likewise be used to cool the components heated by the exhaust gas such as, for example, bearing housing, bearings, etc. If, instead of a hydraulic fluid, the engine oil is applied to the hydraulic retarder, the additionally produced quantity of heat can be guided into the cooling water indirectly via the heat exchanger customary in internal combustion engines. An external heat dissipating device can be entirely eliminated if instead of the hydraulic retarder use is advantageously made of a speed variator.

Other objects, advantages and novel features of the present invention will become apparent from the fol-

DETAILED DESCRIPTION OF THE DRAWINGS

Figure 1:
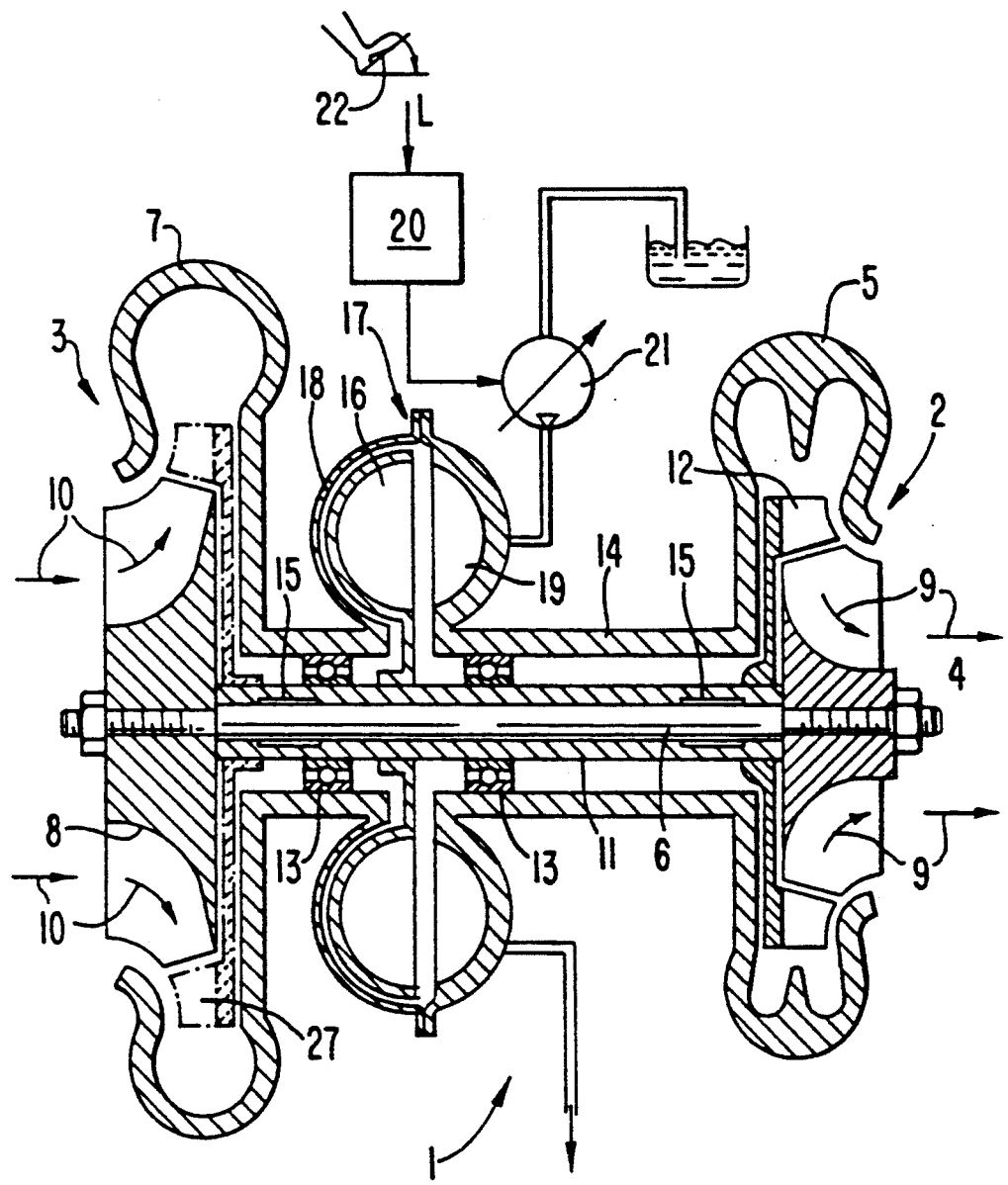
FIG. 1 is a schematic sectional view of an exhaust gas turbocharger constructed according to a preferred embodiment of the invention.

FIG. 1 shows an exhaust gas turbocharger 1 of an internal combustion engine having a turbine 2, arranged in the exhaust pipe of the internal combustion engine, and a compressor 3 arranged in the intake line of the internal combustion engine. Both the turbine 2 and the compressor 3 are of radial design here. The turbine 2 consists of a turbine wheel 4, which is arranged in a two-duct, spiral turbine housing 5 and is connected to a shaft 6 in a rotationally fixed fashion. Likewise mounted in a rotationally fixed fashion on this shaft 6 is the compressor wheel 8, which is arranged in the spiral compressor housing 7 of the exhaust gas turbocharger 1. The flow direction of the exhaust gases is marked by the arrows 9, and the fresh air conveyed to the compressor 3 by the arrows 10. The shaft 6 connecting the compressor wheel 8 to the turbine wheel 4 is surrounded by a hollow shaft 11, which is connected in a rotationally fixed fashion to a turbine guide wheel 12 concentrically surrounding the turbine wheel 4. The hollow shaft 11 is mounted rotatably in this arrangement via the two antifriction bearings 13 in the exhaust gas turbocharger housing 14. The hollow shaft 11 and shaft 6 are arranged concentrically relative to one another and mounted rotatably relative to one another via the two slide bearings 15.

Further mounted in a rotationally fixed fashion on the hollow shaft 11 is the rotor 16 of a hydraulic retarder 17 whose housing 18 and thus whose stator 19 are rigidly connected to the turbocharger housing 14. The hydraulic retarder 17 can be filled with hydraulic fluid or engine oil from the lubricant circuit 70 of the internal combustion engine (shown in dotted lines in FIG. 1), the level, that is to say the amount of oil located in the circuit between the stator 19 and rotor 16, being a measure of that output with which the hollow shaft 11 and thus the turbine guide wheel 12 are braked. The change in the level and thus in the braking power is performed via an oil pump 21, which is driven by an electronic control unit 20, specifically as a function of the engine speed, the turbine speed, the compressor pressure and the deflection L of the accelerator pedal 22, and thus as a function of the stipulated load of the internal combustion engine. The driving of the hydraulic retarder 17 is performed in the manner according to the invention in such a way that starting from the part load range the amount of oil located in the flow circuit between the rotor 16 and stator 19 increases with rising load of the internal combustion engine, that is to say the hollow shaft 11 or the turbine guide wheel 12 is ever more strongly braked with rising load.

Figure 2A:
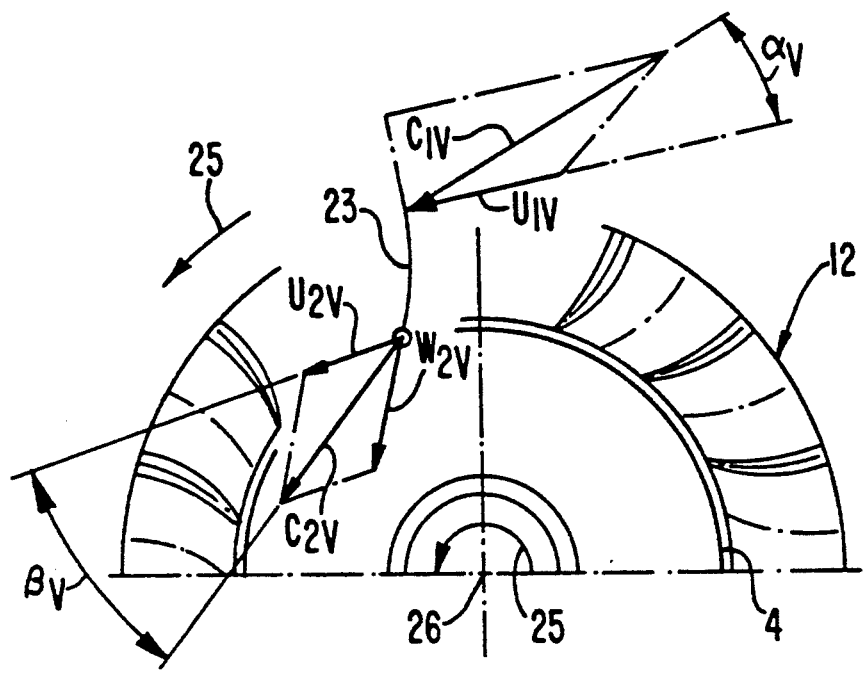
FIG. 2a is a schematic view which shows the velocity relationships at the turbine guide wheel of the exhaust gas turbocharger of FIG. 1 under full load.
Figure 2B:
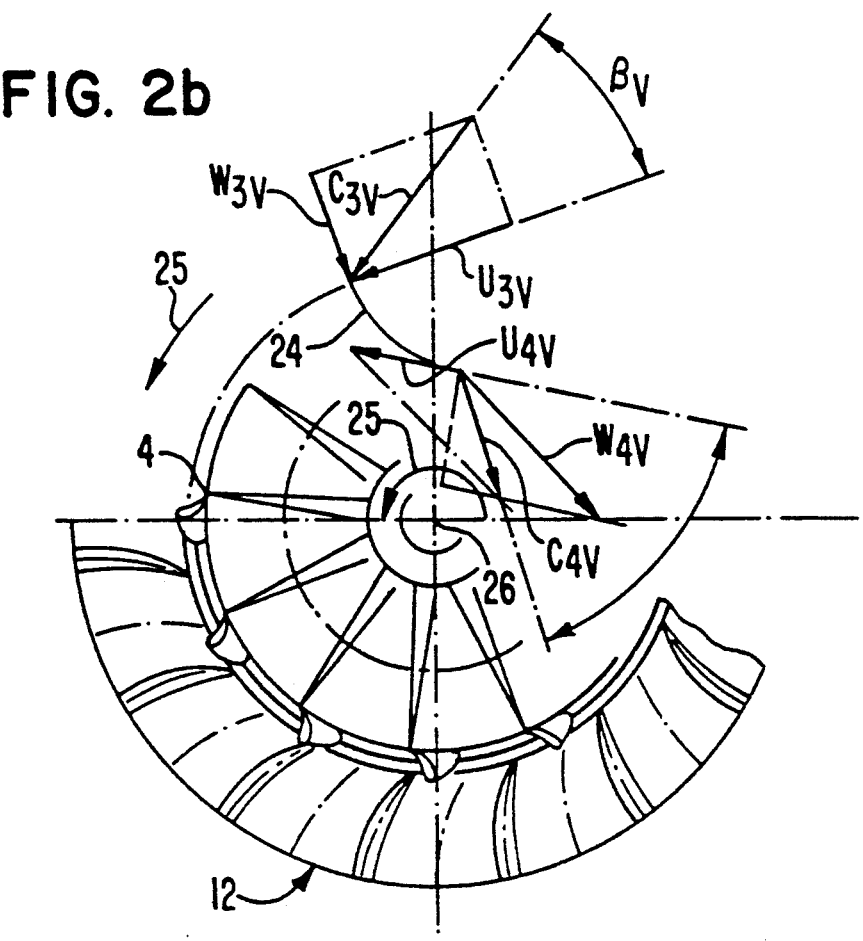
FIG. 2b is a schematic view which shows the velocity relationships at the turbine wheel of the exhaust gas turbocharger of FIG. 1 under full load.
Figure 3A:
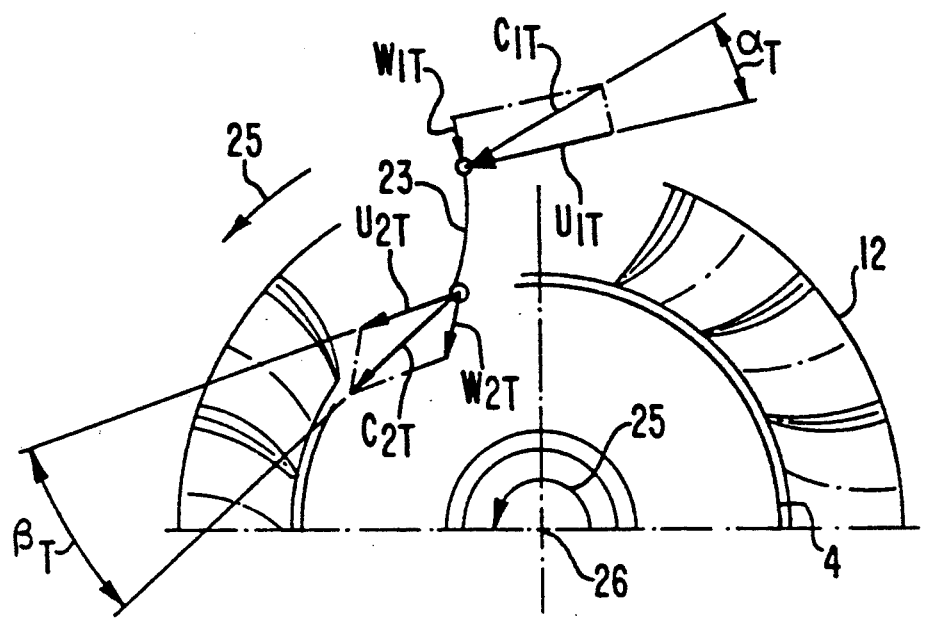
FIG. 3a is a schematic view which shows the velocity relationships at the turbine guide wheel of the exhaust gas turbocharger of FIG. 1 under part load.
Figure 3B:
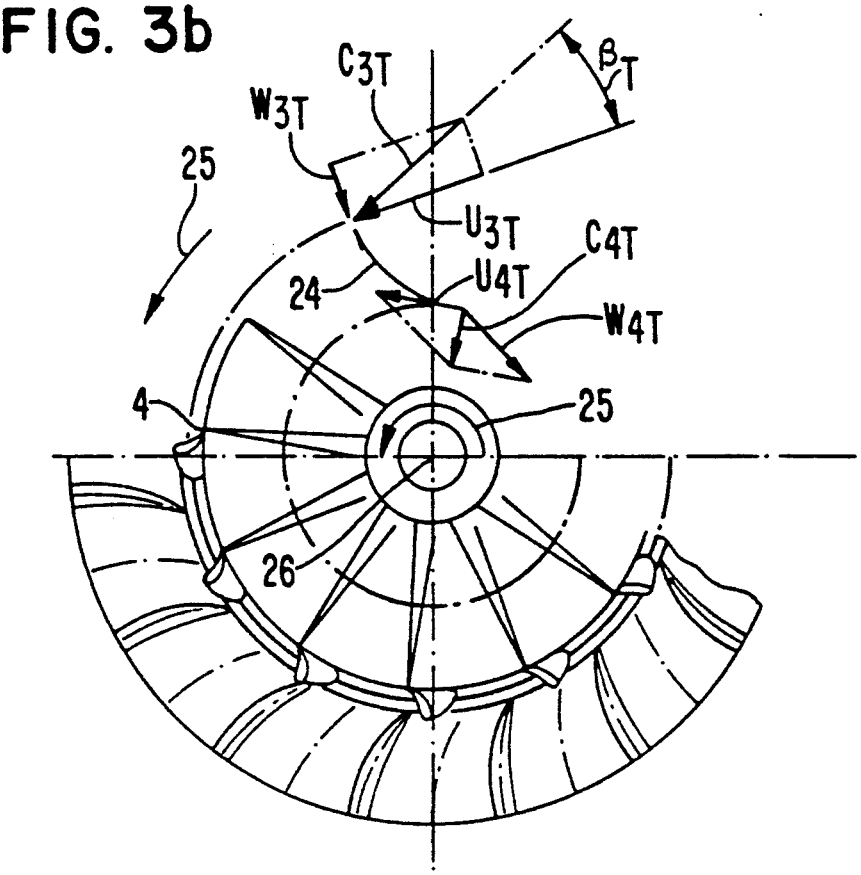
FIG. 3b is a schematic view which shows the velocity relationships at the turbine wheel of the exhaust gas turbocharger of FIG. 1 under part load.

The velocity relationships at the turbine guide wheel 12 and at the turbine wheel 4—or at their projections—are shown in the following FIGS. 2a, 2b, 3a and 3b, specifically in the case of a strongly braked guide wheel 12 under full load (FIGS. 2a and 2b) and in the case of a non-braked guide wheel 12 in the part load range (FIGS. 3a and 3b). These velocity relationships are represented in each case at a single blade profile, specifically at a blade 23 of the turbine guide wheel 12 under full load in FIG. 2a, at this blade 23 of the turbine guide wheel 12 under part load in FIG. 3a, at a blade 24 of the turbine wheel 4 under full load in FIG. 2b, and at this blade 24 of the turbine wheel 4 under part load in FIG. 3b. The blading is chosen such that both wheels 4 and 12 rotate in the direction of the arrows 25. Both wheels 4 and 12 thus rotate in the same direction, so that the relative velocity between the turbocharger shaft 6 and the hollow shaft 11, which is slidingly mounted thereupon and carries the turbine guide wheel 12, is smaller, as a result of which the friction losses in the slide bearing 15 are reduced. The identical direction of rotation of both wheels 4 and 12 has the further advantage that after exiting from the turbine guide wheel 12 the flow need not be too strongly deflected upon entry into the turbine wheel 4, so that the losses occurring upon entry into the turbine wheel 4 are kept to a minimum. Moreover, in the case of an identical direction of rotation of both wheels 4 and 12, the turbine housing 5 can be of smaller dimension—referred to the same turbine output.

The blading of the turbine guide wheel 12 is, furthermore, designed to a maximum centrifugal force, that is to say the maximum speed of the turbine guide wheel 12, which has a larger diameter, is smaller than that of the turbine wheel 4. It is therefore possible to use conventional antifriction bearings 13 to mount the hollow shaft 11 in the turbine housing 5 even given the occurrence of relatively high turbine wheel speeds.

FIG. 2a shows the velocity relationships at the turbine guide wheel 12 under full load. Full load means that the flow impinging from the turbine housing 5, that is to say from the spiral swirl duct on the guide blades 23, enters the turbine guide wheel 12 with a relatively large absolute velocity $l_v$ (large quantity of exhaust gas). In this case, the flow enters the turbine guide wheel 12 at an angle $a_v$ (the index V stands for full load) to the tangent at the circle at the entry point. Since in the manner according to the invention the turbine guide wheel 12 is strongly braked in this operating state of the internal combustion engine, the result at the entry to the turbine guide wheel 12 is only a relatively small, imposed component $u_{1v}$ of the circumferential velocity. In this case, the flow is deflected at the blade 23 and merges into a flow congruent with the blade. There is then a correspondingly smaller circumferential component $u_{2v}$ at the exit from the turbine guide wheel 12 in accordance with the radius which is smaller at this point. Since a flow congruent with the blade is present upon exit from the turbine guide wheel 12, there is likewise a velocity component $W_{2v}$ which extends tangentially relative to the blade at the exit from the guide wheel 12 (component parallel to the blade). These two velocities $u_{2v}$ and $W_{2v}$ then yield by geometrical addition the absolute velocity $c_{2v}$ with which the flow then enters the turbine wheel 4. The absolute velocity $c_{2v}$ and the circumferential velocity $u_{2v}$ enclose the angle $\beta v$ in this case. The flow now enters the turbine wheel 4 at this angle $\beta v$ (see FIG. 2b). Since the turbine wheel 4 can rotate freely, a flow congruent to the blade is present—in the steady-state condition—from the very beginning. This means that the absolute velocity $c_{2v}=c_{3v}$ can be resolved into a circumferential component $u_{3v}$ and a component $W_{3v}$ parallel to the blade, that is to say extending in the direction of the tangent at the blade 24 at the respective point. Taking appropriate account of the respective radius, the circumferential component $u_{3v}$ yields the speed of the turbine wheel 4 arising in the case of this flow $c_{2v}=c_{3v}$. It may be seen that in the case of a decreasing angle -$\beta$- that is to say of a flatter approach flow to the wheel 4—the circumferential component $u_{3v}$ and thus the speed of the turbine wheel become larger. Finally, the absolute velocity $c_{4v}$ at the exit from the turbine wheel 4 is yielded by geometrical addition of the two components of circumferential velocity $u_{4v}$ and $W_{4v}$. Because the blades 24 of the turbine wheel 4 are spatially curved, the velocity component $w_{4v}$, which is parallel to the blade, at the exit from the turbine wheel 4 naturally does not extend parallel to the plane of the drawing.

If the internal combustion engine is operated under part load, the absolute velocity c1T (the index T stands for part load) with which the exhaust gas current enters the turbine guide wheel 12 is, as may be seen in FIG. 3a, relatively small by comparison with operation under full load (c1v) (small quantity of exhaust gas). The angle $\alpha T$ with which the exhaust gas flow enters the turbine guide wheel is virtually the same size under part load as under full load ($\alpha T = \alpha V$). Since in the manner according to the invention the turbine guide wheel 12 can run freely in the part load range, that is to say is not braked, a flow congruent to the blade arises at the guide blades 23 as early as on entry into the guide wheel 12. This means that the absolute velocity $c_{1T}$ can be resolved into the component w1T parallel to the blade and the circumferential component $u_{1T}$ the circumferential component u on the respective radius being in turn a measure of the speed of the turbine guide wheel 12 that arises. Since a flow congruent to the blade is present all the time that flow takes place through the guide wheel blading 23, the absolute velocity $c_{2T}$ at the exit from the turbine guide wheel 12 is composed, in turn, from a circumferential component $u_{2T}$, which naturally extends here as well in the direction of the tangent at the circle at the point of exit from the guide wheel 12, and a component $W_{2T}$ parallel to the blade. The modulus of the circumferential velocity $u_{2T}$ at the exit from guide wheel is, in accordance with the smaller radius at this point, correspondingly smaller than that of the circumferential component $u_{2T}$ at the entry to the turbine guide wheel 12. Assuming a flow that is congruent to the blade, the modulus of the component w parallel to the blade normally behaves inversely proportional to the relationships of the flow cross-section along a guide blade 23. This means, in other words, that if the flow cross-section to the exit from the guide wheel blading is kept at the same size, the modulus of the velocity component w to the exit from the guide wheel blading is also constant (continuity condition). Finally, geometrical addition of two velocity components $u_{2T}$ and $w_{2T}$ yields the absolute velocity $c_{2T}$ with which the exhaust gas flow exits from the turbine guide wheel blading 23. Said flow exits from the guide wheel at the angle $\beta_T$ to the circumferential component $u_{2T}$. However, it is precisely at this angle $\beta T$ that the flow also enters the turbine wheel 4 (see FIG. 3b). It may be seen that the angle $\beta_T$ is smaller than the angle $\beta_v$ (see FIGS. 2a and 2b). This means, in other words, that under part load, that is to say in the case of a free running turbine guide wheel 12, the turbine wheel 4 is approached relatively flat, that is to say flatter than under full load. Since the turbine wheel 4 can also rotate freely, that is to say a flow congruent to the blade is once again present, the absolute velocity $c_{2T}=c_{3T}$ at the entry to the turbine wheel 4 can once again be resolved into a velocity component $w_{3T}$ parallel to the blade and a circumferential component $u_{3T}$. Since the approach flow to the turbine wheel 4 takes place at a relatively small angle $\beta T$ by comparison with operation under full load, there is a relatively large circumferential component $u_{3T}$ and thus a relatively high speed of the turbine wheel 4. It is a consequence of a relatively high turbine wheel speed in the part load range that more compressor work is performed even in this operating state and that after a positive load change only a short time passes until the turbine wheel speed has reached the value corresponding to the respective stipulated load. A good response of the turbocharger 1 and improved exhaust gas values of the internal combustion engine are thereby achieved. However, at the same time the flatter approach flow to the turbine wheel 4 is not bound up with a reduction in the flow cross-section by comparison with operation under full load. An increased exhaust back pressure therefore does not lead to any sort of additional friction losses or losses in efficiency.

As also in the case of operation under full load, the turbine wheel 4 can rotate freely under part load. In accordance with the smaller radius at the exit from the wheel 4, a smaller circumferential component $u_{4T}$ is also present here. The geometrical addition of the two components $u_{4T}$ and $w_{4T}$ finally yields the absolute velocity $c_{4T}$ with which the exhaust gas exits from the turbine wheel 4. Because the blades 24 of the turbine wheel 4 are spatially curved, the velocity component $W_{4T}$ parallel to the blade, at the exit from the turbine wheel 4 naturally does not extend parallel to the plane of the drawing. It may further be seen in FIG. 3b that the absolute velocity $c_{4T}$ with which the exhaust gas flow exits from the turbine wheel 4 is directed under part load onto the axis 26 of rotation of the turbocharger 1. This means that the exhaust gas flows out from the wheel 4 free from swirl under part load.

In a further embodiment of the invention, it is also possible further to connect a compressor guide wheel 27 (represented by dots and dashes in FIG. 1) concentrically surrounding the compressor wheel 8 to the hollow shaft 11 in a rotationally fixed fashion. This compressor guide wheel 27 is provided with a blading opposite to the blading of the turbine guide wheel 12 in such a way that the compressor guide wheel 27 is ever more strongly braked with a rising load of the internal combustion engine, that is to say thus with rising turbine and thus compressor wheel speed. This means that the hydraulic retarder need only supply a reduced braking power in order to be able to realize the speed of the turbine guide wheel 12 corresponding to the respective internal combustion engine load region. The hydraulic retarder 17 can thus have relatively small dimensions.

Figure 4:
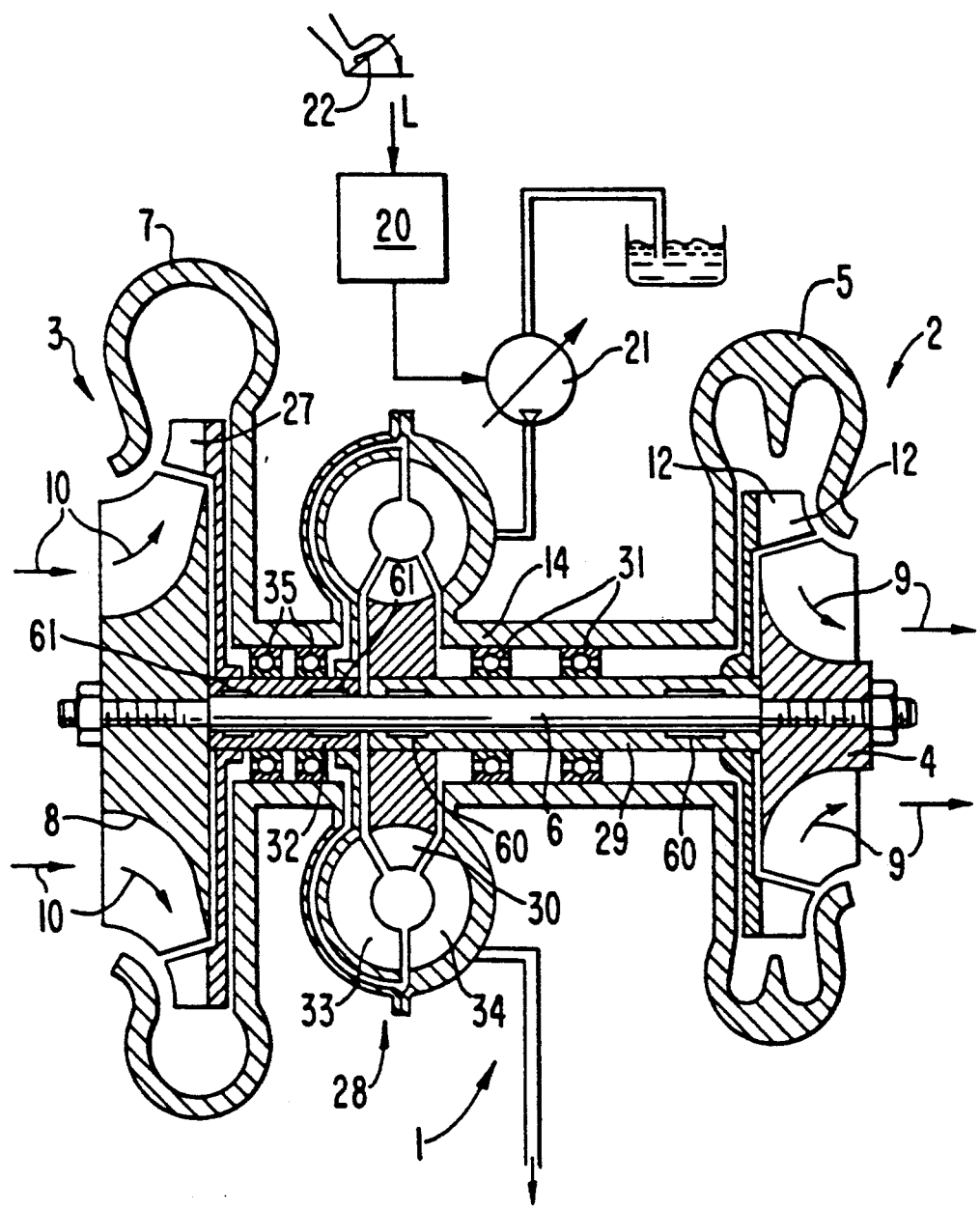
FIG. 4 is a schematic sectional view of a further exemplary embodiment of an exhaust gas turbocharger according to the invention.

In a further exemplary embodiment represented in FIG. 4, it is provided to couple the turbine guide wheel 12 to the compressor guide wheel 27 via a hydraulic coupling or a speed variator 28. Provided in the latter case is a first hollow shaft 29 which is slidingly mounted (slide bearing 60) on the shaft 6 and which is connected at one end in a rotationally fixed fashion to the turbine guide wheel 12 and at the other end in a rotationally fixed fashion to the pump wheel 30 of the speed variator 28. The first hollow shaft 29 is supported in the turbocharger housing 14 via the two antifriction bearings 31. Slidingly mounted slide bearing 61) on the shaft 6 is, furthermore, a second hollow shaft 32 which is connected at one end in a rotationally fixed fashion to the compressor guide wheel 27 and at the other end in a rotationally fixed fashion to the turbine wheel 33 of the speed variator 28. The guide wheel of the speed variator is denoted by 34. Mounting of the second hollow shaft 32 in the turbocharger housing 14 is performed via the antifriction bearings 35.

Here, as well, the braking moment exerted by the speed variator 28 on the turbine guide wheel 12 is controlled by correspondingly matching the oil level thereof. This embodiment provides the advantage that the compressor guide wheel 27 can run, if required, at a different, in particular higher speed than the turbine guide wheel 12. During filling with oil, the compressor guide wheel then momentarily requires more driving power than the turbine guide wheel can deliver, as a result of which its speed drops until a common working point is reached, and as a result of which the turbine wheel is simultaneously regulated according to the invention by a steeper approach flow without there being a need for this reason to dissipate outwards from the system the heat arising due to a braking device. It is provided, furthermore, to decouple the turbine guide wheel 12, by completely emptying the speed variator 28, from the compressor guide wheel 27 in low internal combustion engine load ranges in which, according to the invention, the turbine guide wheel 12 is not to be braked (hydraulic coupling). This has the advantage that, starting from the low load range in a part load range in which the turbine guide wheel 12 has not yet been braked (for example during the starting operation), in the case of a positive load change the turbine guide wheel 12 can rev up relatively quickly and reach maximum speed, because due to the decoupling there is no need for the compressor guide wheel 27 as well also to be accelerated and moved. Consequently, even in the lowest load ranges an improved response is achieved after a positive load change.

Figure 5:
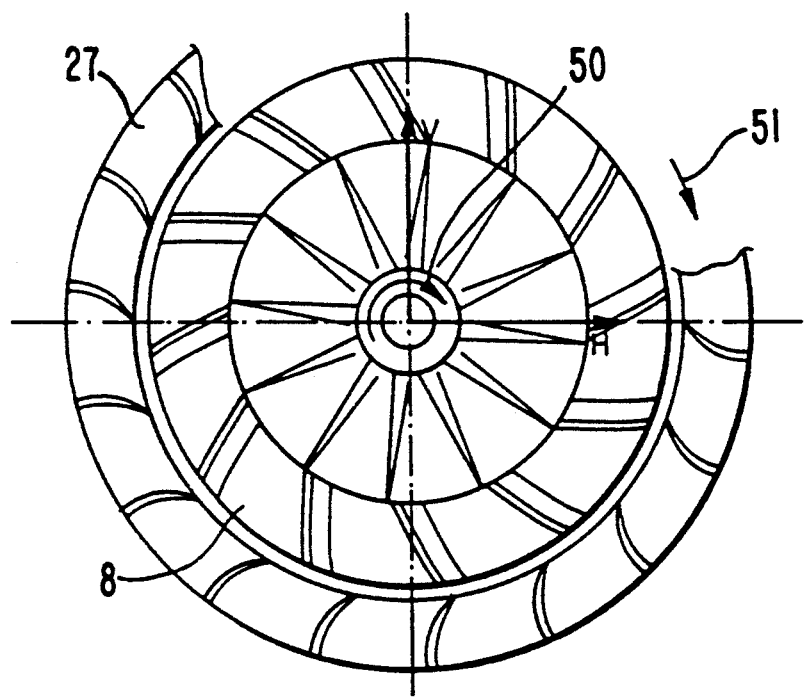
FIG. 5 is a schematic view which shows the development of the compressor guide wheel and the compressor wheel of the exhaust gas turbochargers of FIGS. 1 and 4.

FIG. 5 shows the compressor wheel 8 and the 20 compressor guide wheel 27 in a mode of representation corresponding to FIGS. 2a to 3b. The direction of rotation of the compressor wheel 8 is marked by the arrow 50, and the direction of rotation of the compressor guide wheel 27 by the arrow 51. The blading of the compressor guide wheel 27 is constructed in an opposite fashion to that of the turbine guide wheel 12. Whereas in the turbine guide wheel 12 the individual blades are curved against the direction of rotation of the turbine guide wheel 12 (see FIGS. 2a to 3b), the individual blades of the compressor guide wheel 27 are curved in the direction of rotation of the compressor guide wheel 27.

Instead of a hydraulic brake, it is also contemplated to use an eddy-current brake, a pneumatic brake (compressed air) or a mechanical brake (friction). Instead of a hydraulic coupling or a speed variator, it is also likewise possible to apply substitute systems which act mechanically or electrically.

The invention is not limited to a mutually concentric arrangement of wheels and guide wheels. It is likewise conceivable to arrange the wheels and guide wheels behind one another. This holds both on the turbine side and on the compressor side. Such an arrangement is, for example, present in turbochargers of axial design which are applied in the case of larger engines.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Exhaust gas turbocharger arrangement for an internal combustion engine comprising:
   a turbine wheel, which is arranged in a turbine housing and to which the exhaust gas of the internal combustion engine is applied;
   a compressor wheel arranged in a compressor housing;
   a shaft connecting said turbine wheel in the turbine housing to said compressor wheel in the compressor housing;
   a turbine guide wheel, which is arranged in the turbine housing upstream of the turbine wheel and mounted rotatably relative thereto and whose rotational speed can be varied as a function of the load of the internal combustion engine; and
   at least one braking device which reduces the rotational speed of the turbine guide wheel, said at least one braking device being inoperative below a predetermined limit value for said load of the internal combustion engine, and operative above said predetermined limit value.

2. Exhaust gas turbocharger arrangement according to claim 1, wherein the turbine wheel is concentrically surrounded by the turbine guide wheel.

3. Exhaust gas turbocharger arrangement according to claim 2, wherein the turbine guide wheel is connected in a rotationally fixed fashion to a compressor guide wheel, which compressor guide wheel concentrically surrounds the compressor wheel and has a blading opposite to the blading of the turbine guide wheel.

4. Exhaust gas turbocharger arrangement according to claim 2, wherein the turbine guide wheel is connected via a speed variator to a compressor guide wheel which concentrically surrounds the wheel of the compressor and has a blading opposite to the blading of the turbine guide wheel.

5. Exhaust gas turbocharger arrangement according to claim 2, wherein a coaxial mounting is chosen for a wheel set formed by the turbine wheel and compressor wheel, for a guide wheel set formed by and the turbine guide wheel and compressor guide wheel, in which the guide wheel set is mounted opposite the exhaust gas turbocharger arrangement housing in ball bearings and the wheel set is mounted opposite the guide wheel set in slide bearings.

6. Exhaust gas turbocharger arrangement according to claim 1, wherein the braking device is a contactless brake.

7. Exhaust gas turbocharger arrangement according to claim 6, wherein the braking device is a hydraulic brake.

8. Exhaust gas turbocharger arrangement according to claim 6, wherein the braking device is an aerodynamic brake in the form of a compressor guide wheel onto which the compressor air flows and which is thereby braked.

9. Exhaust gas turbocharger arrangement according to claim 1, wherein the turbine guide wheel is connected in a rotationally fixed fashion to a compressor guide wheel, which compressor guide wheel concentrically surrounds the compressor wheel and has a blading opposite to the blading of the turbine guide wheel.

10. Exhaust gas turbocharger arrangement according to claim 1, wherein the turbine guide wheel is connected via speed variator to a compressor guide wheel which concentrically surrounds the compressor wheel in the compressor housing and has a blading opposite to the blading of the turbine guide wheel.

11. Exhaust gas turbocharger arrangement according to claim 1, wherein the turbine guide wheel is connected via a hydraulic coupling to a compressor guide wheel which concentrically surrounds the compressor wheel in the compressor housing and has a blading opposite to the blading of the turbine guide wheel.

12. Exhaust gas turbocharger arrangement according to claim 1, wherein the blading of the turbine guide wheel and the compressor guide wheel, forming a guide wheel set, is chosen in relation to that of the turbine wheel and the compressor wheel, forming a wheel set, such that the wheel set rotates faster than the guide wheel set, and that the direction of rotation of both the wheel set and guide wheel set are the same.

13. Exhaust gas turbocharger arrangement according to claim 1, wherein a coaxial mounting is chosen for a wheel set formed by the turbine wheel and compressor wheel, for a guide wheel set formed by and the turbine guide wheel and compressor guide wheel, in which the guide wheel set is mounted opposite the exhaust gas turbocharger arrangement housing in ball bearings and the wheel set is mounted opposite the guide wheel set in slide bearings.

14. Exhaust gas turbocharger arrangement according to claim 1, wherein the blading of the turbine guide wheel is shaped such that the entry and exit cross-sections are of the same extent despite the difference in radii.

15. Exhaust gas turbocharger arrangement according to claim 1, wherein the blading of the turbine wheel is chosen such that when said at least one braking device is applied, an outward flow from the turbine wheel is free from a circumferential component under part load, and affected by the circumferential component under full load to obtain maximum utilization of work under part load.

16. Exhaust gas turbocharger arrangement according to claim 1, wherein hydraulic fluid which is used as a working medium in a hydraulic brake, a hydraulic coupling or a speed variator for regulating the guide wheel speed is replaced by oil from the lubricant circuit of the internal combustion engine, the existing heat exchanger of the internal combustion engine being used to dissipate the frictional heat arising during the regulating process.

17. Exhaust gas turbocharger arrangement according to claim 1, wherein components of the exhaust gas turbocharger arrangement are arranged axially.

* * * * *